United States Patent
Xu

(10) Patent No.: US 9,525,283 B2
(45) Date of Patent: Dec. 20, 2016

(54) OUTPUT OVERVOLTAGE PROTECTION METHOD AND CIRCUIT FOR SWITCHING POWER SUPPLY AND SWITCHING POWER SUPPLY THEREOF

(71) Applicant: Silergy Semiconductor Technology (Hangzhou) LTD, Hangzhou, ZheJiang Province (CN)

(72) Inventor: Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 262 days.

(21) Appl. No.: 14/509,738

(22) Filed: Oct. 8, 2014

(65) Prior Publication Data

US 2015/0109835 A1    Apr. 23, 2015

(30) Foreign Application Priority Data

Oct. 21, 2013  (CN) .......................... 2013 1 0497599

(51) Int. Cl.
*H02H 3/20* (2006.01)
*H02H 9/04* (2006.01)
*H02H 7/12* (2006.01)

(52) U.S. Cl.
CPC ........... *H02H 7/1213* (2013.01); *H02H 3/202* (2013.01)

(58) Field of Classification Search
CPC ............. H02H 9/04; H02H 9/041; H02H 3/20
USPC ....................................................... 361/91.1
See application file for complete search history.

(56) References Cited

U.S. PATENT DOCUMENTS

| | | | |
|---|---|---|---|
| 8,067,925 B2 | 11/2011 | Grimm | |
| 8,710,905 B2 | 4/2014 | Chen | |
| 9,035,586 B2 * | 5/2015 | Lan | ........... H02P 6/14 318/400.01 |
| 2009/0016084 A1 * | 1/2009 | Trattler | ................. H02M 3/073 363/60 |
| 2013/0313974 A1 * | 11/2013 | Fan | ..................... H05B 33/0815 315/127 |
| 2014/0198540 A1 * | 7/2014 | Xu | ................... H02M 3/33523 363/21.12 |

* cited by examiner

*Primary Examiner* — Dharti Patel
(74) *Attorney, Agent, or Firm* — Michael C. Stephens, Jr.

(57) ABSTRACT

In one embodiment, an output overvoltage protection method for a switching power supply, can include: (i) charging a first capacitor by a first current during a first time interval of a switching period of the switching power supply; (ii) charging a second capacitor by a second current during a second time interval of the switching period of the switching power supply; and (iii) generating an overvoltage protection signal by comparing a first voltage across the first capacitor against a second voltage across the second capacitor at the end of the second time interval, where the overvoltage protection signal is active when the first voltage is at least as high as the second voltage.

20 Claims, 17 Drawing Sheets

Charge a first capacitor by a first current in a first predetermined time interval, and charge a second capacitor by a second current in a second predetermined time interval
201

Compare a voltage across the first capacitor and a voltage across the second capacitor at the end of the second time interval to generate an overvoltage protection signal
202

FIG. 2

OUTPUT OVERVOLTAGE PROTECTION METHOD AND CIRCUIT FOR SWITCHING POWER SUPPLY AND SWITCHING POWER SUPPLY THEREOF

RELATED APPLICATIONS

This application claims the benefit of Chinese Patent Application No. 201310497599.X, filed on Oct. 21, 2013, which is incorporated herein by reference in its entirety.

FIELD OF THE INVENTION

The present invention relates to electronics, and more specifically to overvoltage protection methods and circuits, and an associated switching power supply.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, an output overvoltage protection method for a switching power supply, can include: (i) charging a first capacitor by a first current during a first time interval of a switching period of the switching power supply, where the first current is in direct proportion with a first proportionality coefficient to an input voltage of the switching power supply, and where the first time interval is substantially the same as a time coefficient of the input voltage; (ii) charging a second capacitor by a second current during a second time interval of the switching period of the switching power supply, where the second current is in direct proportion with a second proportionality coefficient to an upper limit voltage of a load of the switching power supply, and where the second time interval is substantially the same as a time coefficient of an output voltage of the switching power supply; and (iii) generating an overvoltage protection signal by comparing a first voltage across the first capacitor against a second voltage across the second capacitor at the end of the second time interval, where the overvoltage protection signal is active when the first voltage is at least as high as the second voltage.

In one embodiment, an output overvoltage protection circuit configured in a switching power supply having a switching period comprising first and second time intervals, the output overvoltage protection circuit, can include: (i) a first charging circuit configured to generate a first voltage that is in direct proportion with a first proportionality coefficient to a ratio of a product of an input voltage of the switching power supply and the first time interval, and a capacitance of a first capacitor, where the first time interval is substantially the same as a time coefficient of the input voltage; (ii) a second charging circuit configured to generate a second voltage that is in direct proportion with a second proportionality coefficient to ratio between a product of an upper limit voltage of a load of the switching power supply and the second time interval, and a capacitance of a second capacitor, where the second time interval is substantially the same as a time coefficient of an output voltage of the switching power supply; and (iii) a comparison circuit configured to compare the first voltage against the second voltage at the end of the second time interval to generate an overvoltage protection signal, where the overvoltage protection signal is active when the first voltage is at least as high as the second voltage.

BRIEF DESCRIPTION OF THE DRAWINGS

FIG. 2 is a flow diagram of a first example output overvoltage protection method, in accordance with embodiments of the present invention.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
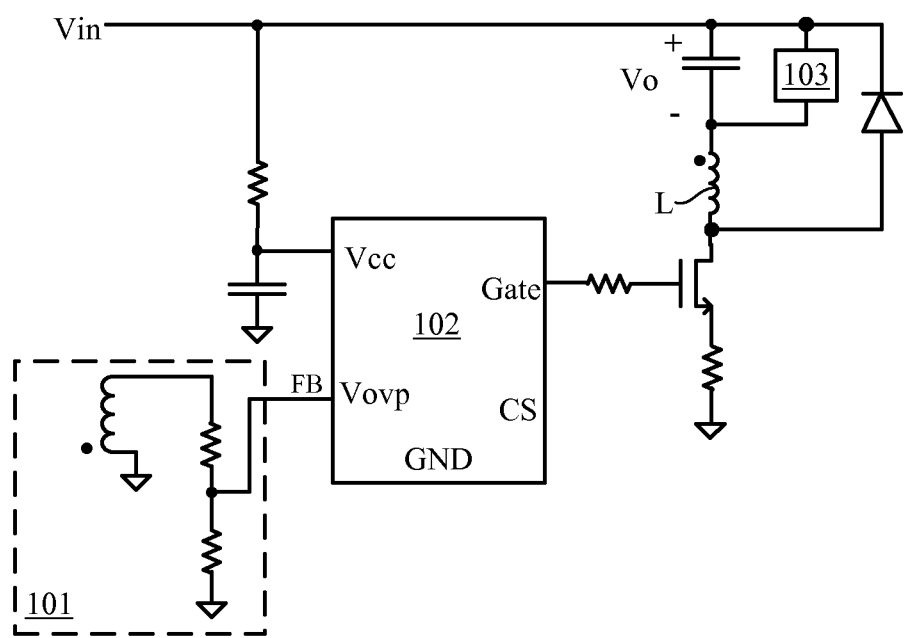
FIG. 1 is a schematic block diagram of an example switching power supply with an output overvoltage protection circuit.

Referring now to FIG. 1, shown is a schematic block diagram of an example switching power supply with an output overvoltage protection circuit. In some cases, the switching supply or load 103 can malfunction, and an output voltage of the switching power supply can sometimes significantly increase. An "overvoltage" situation can occur when the output voltage is higher than an upper limit of load 103. This can cause damage and/or loss of operation of load 103. An overvoltage protection circuit can be employed in the switching power supply to address this potential problem of overvoltage of the output voltage. When an overvoltage situation is detected, an overvoltage protection signal may be generated to control the output voltage to be consistent with (or within limits of) a voltage required by load 103.

Auxiliary winding 101 may be coupled to the output terminals of the switching power supply in order to generate feedback voltage FB that represents the output voltage. Feedback voltage FB can be provided to an overvoltage protection terminal (e.g., Vovp) of control circuit 102 of the switching power supply. Control circuit 102 may determine whether the overvoltage occurs in accordance with feedback voltage FB, and may take suitable overvoltage protection. However, drawbacks of this approach include auxiliary winding 101 having a relatively large volume and high cost, as well as potentially lower conversion efficiency.

In one embodiment, an output overvoltage protection method for a switching power supply, can include: (i) charging a first capacitor by a first current during a first time interval of a switching period of the switching power supply, where the first current is in direct proportion with a first proportionality coefficient to an input voltage of the switching power supply, and where the first time interval is substantially the same as a time coefficient of the input voltage; (ii) charging a second capacitor by a second current during a second time interval of the switching period of the switching power supply, where the second current is in direct proportion with a second proportionality coefficient to an upper limit voltage of a load of the switching power supply, and where the second time interval is substantially the same as a time coefficient of an output voltage of the switching power supply; and (iii) generating an overvoltage protection signal by comparing a first voltage across the first capacitor against a second voltage across the second capacitor at the end of the second time interval, where the overvoltage protection signal is active when the first voltage is at least as high as the second voltage.

In one embodiment, an output overvoltage protection circuit configured in a switching power supply having a switching period comprising first and second time intervals, the output overvoltage protection circuit, can include: (i) a first charging circuit configured to generate a first voltage that is in direct proportion with a first proportionality coefficient to a ratio of a product of an input voltage of the switching power supply and the first time interval, and a capacitance of a first capacitor, where the first time interval is substantially the same as a time coefficient of the input voltage; (ii) a second charging circuit configured to generate a second voltage that is in direct proportion with a second proportionality coefficient to ratio between a product of an upper limit voltage of a load of the switching power supply and the second time interval, and a capacitance of a second capacitor, where the second time interval is substantially the same as a time coefficient of an output voltage of the switching power supply; and (iii) a comparison circuit configured to compare the first voltage against the second voltage at the end of the second time interval to generate an overvoltage protection signal, where the overvoltage protection signal is active when the first voltage is at least as high as the second voltage.

Referring now to FIG. 2, shown is a flow diagram of a first example output overvoltage protection method, in accordance with embodiments of the present invention. At 201, a first capacitor can be charged by a first current in a first (e.g., predetermined) time interval, and a second capacitor may be charged by a second current in a second (e.g., predetermined) time interval. The first current may be in direct proportion to an input voltage of the switching power supply, and the second current may be in direct proportion to an upper limit voltage of the load of the switching power supply.

In accordance with the volt-second balance principle of the inductor of the switching power supply, in each switching period, the charging time of first capacitor during the first time interval may be consistent with a time coefficient of the input voltage. Also, the charging time of second capacitor during the second time interval may be consistent with a time coefficient of the output voltage. The switching period including the first and second time intervals may be determined in accordance with a switching cycle of a main power switch of the switching power supply.

Figure 3:
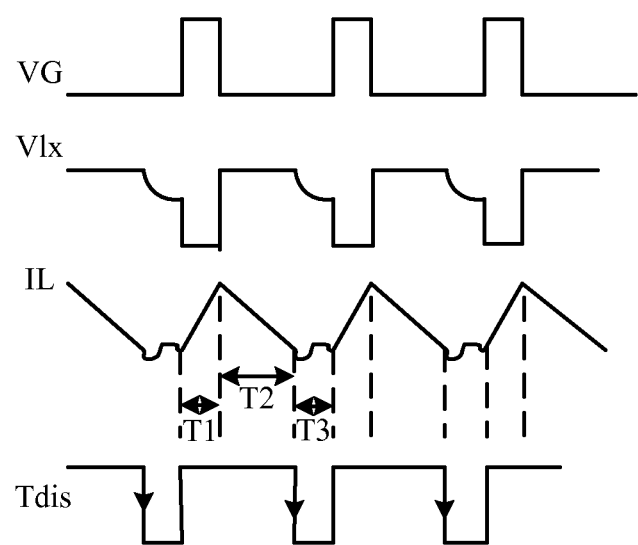
FIG. 3 is a waveform diagram of example switching power supply control, in accordance with embodiments of the present invention.

Referring now to FIG. 3, shown is a waveform diagram of example switching power supply control, in accordance with embodiments of the present invention. The first time interval (e.g., T1) and second time interval (e.g., T2) in one switching period can be determined in accordance with the inductor current during operation of the switching power supply. In each switching period, a time duration when the inductor current increases may be the "first" time interval, and a time duration when the inductor current decreases may be the "second" time interval. For example, when the switching power supply is operated in a boundary continuous conduction mode, each switching period can include the first time interval when the inductor current increases (e.g., continuously) and the second time interval when the inductor current decreases (e.g., continuously).

When the switching power supply is operated in a discontinuous conduction mode, each switching period can include the first time interval when the inductor current increase, the second time interval when the inductor current decreases, as well as a "third" time interval (e.g., T3) when the inductor current is in a resonant mode. In each switching period, a first capacitor may be charged by a first current, and a second capacitor may be charged by a second current. The charging time (e.g., the first time interval and the second time interval) may be controlled in accordance with volt-second balance principles of the inductor of the switching power supply.

At the end of the second time interval of each switching period, when a voltage across the first capacitor is consistent with (e.g., substantially the same as) a voltage across the second capacitor, the present output voltage of the switching power supply may be consistent an upper limit voltage of the load. In this case, the output voltage of the switching power supply may be in an overvoltage boundary mode. In certain embodiments, the first and second time intervals can be partially overlapped, or may not be overlapped along a time axis.

Referring back to FIG. 2, at 202, a voltage across the first capacitor and a voltage across the second capacitor at the end of the second time interval can be compared to generate an overvoltage protection signal. Overvoltage protection operation or other appropriate actions for the switching power supply can be implemented in accordance with the overvoltage protection signal. At the end of second time interval, if voltage of the first capacitor is at least as high as the voltage of the second capacitor, the overvoltage protection signal may be activated.

For example, the first capacitor can be charged by a first current that is in a predetermined direct proportion with the input voltage for the first time interval, in order to generate a voltage that represents the output voltage. The second capacitor may be charged by a second current in a predetermined direct proportion with the upper limit voltage of the load for the second time interval, in order to generate a voltage that represents the upper limit voltage. The voltage across the first capacitor may be compared against the voltage across the second capacitor at the end of the second time interval to generate a voltage comparison signal that may be configured as the overvoltage protection signal. When the voltage across the first capacitor is at least as high as the voltage across the second capacitor at the end of the second time interval, the overvoltage protection signal may be activated.

Figure 4:
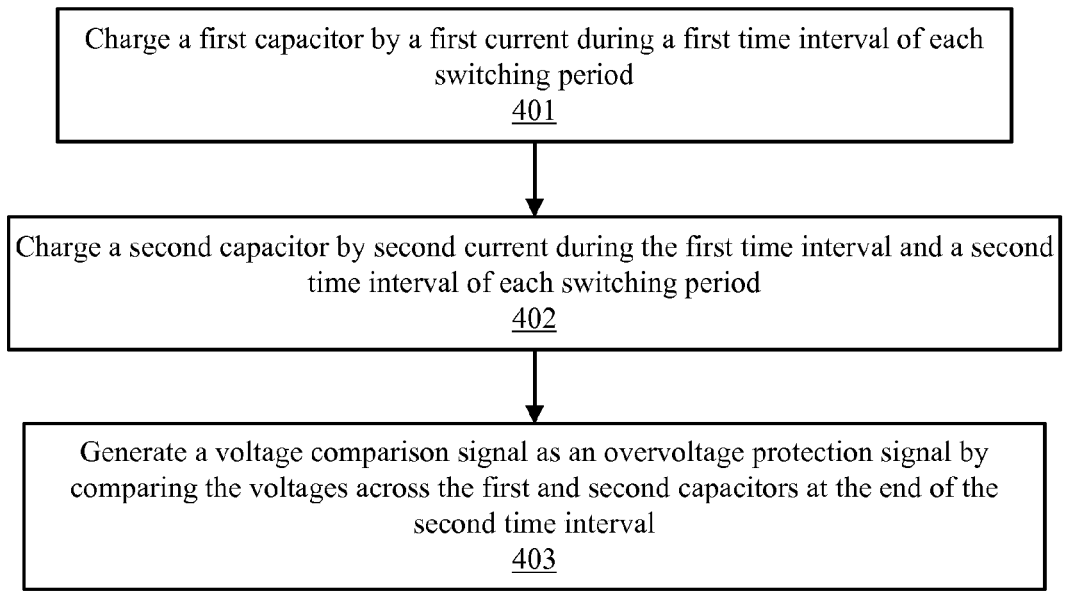
FIG. 4 is a flow diagram of a second example output overvoltage protection method, in accordance with embodiments of the present invention.

Referring now to FIG. 4, shown is a flow diagram of a second example output overvoltage protection method, in accordance with embodiments of the present invention. Also viewing FIG. 4 in conjunction with FIG. 16, the switching power supply can include any suitable converter topology, such as a boost topology, or a buck switching power supply or other switching power supply having a same ratio between the input voltage and the output voltage, to name just a couple of examples. At 401, in time interval T1 of each switching period, capacitor $C_1$ may be charged by current I1. For example, current I1 can be generated by a current generation circuit in accordance with input voltage Vin of the switching power supply. As shown in formula (1) below, current I1 may be in direct proportion to input voltage Vin.

$$I1=Vin*a \quad (1)$$

Here, "a" may be a "first" proportionality coefficient. Also, capacitor $C_1$ may begin to be charged by current I1 at a beginning of time interval T1 of each switching period, and the charging may continue until an end of time interval T1. At 402, capacitor $C_2$ may be charged by current I2 during time intervals T1 and T2 of each switching period. For example, capacitor $C_2$ may begin to be charged by current I2 at a beginning of time interval T1 of each switching period, and this charging may continue until an end of time interval T2. Also for example, current I2 can a predetermined current source. Further, current I2 can be in a predetermined direct proportion to an upper limit voltage "withstand" or breakdown voltage of the load of the switching power supply. Formula (2) below shows this relation with "b" being a "second" proportionality coefficient.

$$I2=Vovp*b \quad (2)$$

For example, Vovp can represent an upper limit voltage withstand of the load of the switching power supply, which may be determined in accordance with the load. Proportionality coefficient "a" and "b" can be related as shown below in formula (3).

$$\frac{b}{a} = \frac{C2}{C1} \quad (3)$$

Here, "C1" can represent a capacitance of capacitor $C_1$, and "C2" can represent a capacitance of capacitor $C_2$. Thus, proportionality coefficient "b" can be determined in accordance with proportionality coefficient "a", and the capacitances of capacitors $C_1$ and $C_2$. At 403, a voltage across capacitor $C_1$ and a voltage across capacitor $C_2$ at the end of time interval T2 can be compared, in order to generate an overvoltage protection signal. For example, when the voltage across capacitor $C_1$ is at least as high as the voltage across capacitor $C_2$ at the end of time interval T2, the overvoltage protection signal may be activated, or in an active state. In response to such an overvoltage status, output voltage Vo of the switching power supply may be regulated to be less than upper limit voltage Vovp withstand of the load to avoid potential damage that could occur due to the overvoltage condition.

Figure 15:
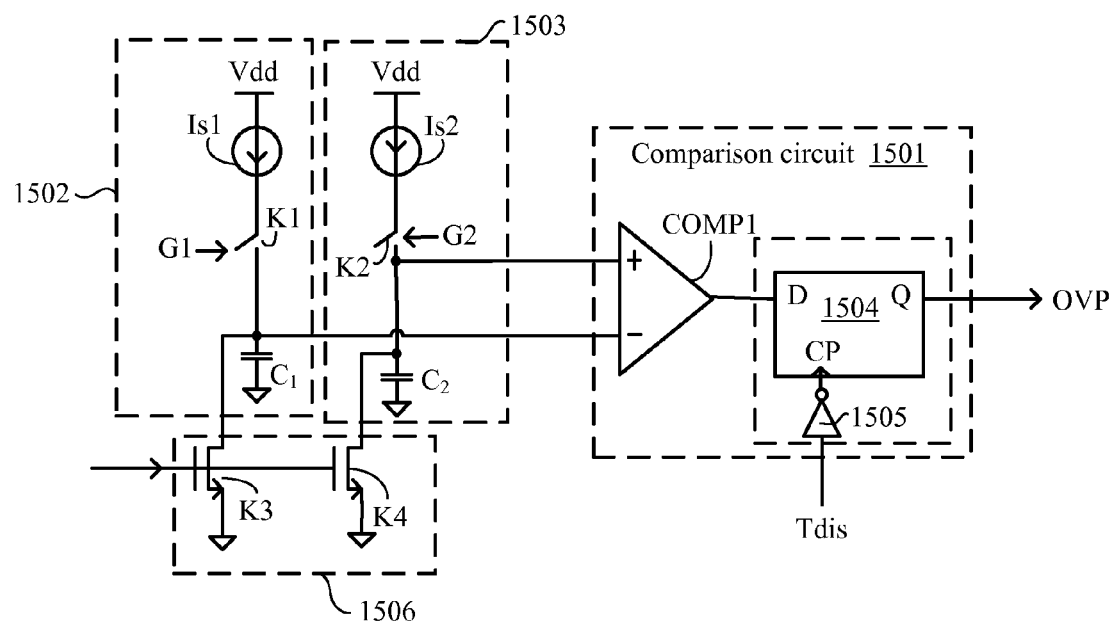
FIG. 15 is a schematic block diagram of an example output overvoltage protection circuit, in accordance with embodiments of the present invention.

As shown in FIG. 15, the overvoltage protection signal can be generated by using comparison circuit 1501, which can include comparator COMP1. Comparator COMP1 can compare voltage V1 across capacitor $C_1$ at its inverting input terminal against voltage V2 across capacitor $C_2$ at its non-inverting input terminal, in order to generate a voltage comparison signal at its output terminal. D-type flip-flop 1504 can receive the voltage comparison signal at input terminal D, and a clock signal at clock control terminal CP. The voltage comparison signal at the end of time interval T2 may be sampled by D flip-flop 1504 in accordance with the clock signal, in order to generate the overvoltage protection signal.

For example, the clock signal input to D flip-flop 1504 can be pulse signal Tdis, which can be high during time intervals T1 and T2, and may be low from the end of second time interval T2 to the beginning of a next switching period (e.g., during time interval T3). A falling edge of pulse signal Tdis can occur at the end of time interval T2, and this signal may be inverted by inverter 1505. The rising edge of the signal from inverter 1505 may trigger the clock control terminal of the D flip-flop. At the end of time interval T2 of each switching period, D flip-flop 1504 may thus generate the overvoltage protection signal (e.g., OVP) at its output terminal, as triggered by pulse signal Tdis. Also, pulse signal may have other waveforms than that shown in the example of FIG. 3, such as other waveforms such that at the end of time interval T2 of each switching period, the clock control terminal of the D flip-flop may be activated to trigger the D flip-flop to generate the overvoltage protection signal.

In accordance with volt-second balance principles of the inductor, for a switching power supply in a steady state, a positive volt-second value and negative volt-second value at the two terminals of the inductor of the switching power supply may be identical to meet the following formula (4).

$$(Vin-Vo) \times T1 = Vo \times T2 \quad (4)$$

Here, Vin represents the input voltage of the switching power supply, Vo represents the output voltage, T1 represents a time duration in which the inductor current is rising in a switching period, and T2 represents a time duration in which the inductor current is falling in a switching period. Formula (4) can thus be converted to formula (5) below.

$$Vin \times T1 = Vo \times (T1+T2) \quad (5)$$

From formula (5), the time coefficient of input voltage Vin may be time interval T1, and the time coefficient of the output voltage Vo may be a sum of time intervals T1 and T2. When output voltage Vo is consistent with or the same as upper limit voltage Vovp, formula (6) can be derived.

$$Vin \times T1 = Vovp \times (T1+T2) \quad (6)$$

Current I1 in a predetermined proportion with input voltage Vin may be employed to charge capacitor C1 during time interval T1, where the proportionality coefficient is proportionality coefficient "a". Therefore, voltage V1 across capacitor $C_1$ can represent Vin×T1. Also, current I2 in a predetermined proportion with upper limit voltage Vovp may be employed to charge capacitor $C_2$ in both time interval T1 and time interval T2, where the proportionality coefficient is proportionality coefficient "b". Therefore, the voltage across second capacitor $C_2$ can represent Vovp×(T1+T2).

The voltage across capacitor $C_1$ and the voltage across capacitor $C_2$ at the end of time interval T2 can be compared to generate the overvoltage protection signal. When voltage V1 across capacitor $C_1$ is higher than voltage V2 across capacitor $C_2$ at the end of time interval T2, the overvoltage protection signal may be active. If voltage V1 across capacitor $C_1$ is higher than voltage V2 across capacitor $C_2$ at the end of time interval T2, the relationship can be obtained as in formula (7).

$$Vin \times T1 = Vo \times (T1+T2) > Vovp \times (T1+T2) \quad (7)$$

Therefore, output voltage Vo may be higher than upper limit voltage Vovp, and the switching power supply may be in an overvoltage status. The overvoltage protection signal may thus be activated to begin output overvoltage regulation. If voltage V1 across capacitor $C_1$ is the same as voltage V2 across capacitor $C_2$ at the end of time interval T2, the relationship can be obtained as below in formula (8).

$$Vin \times T1 = Vo \times (T1+T2) = Vovp \times (T1+T2) \quad (8)$$

Therefore, output voltage Vo may be consistent with (e.g., substantially a same level as) upper limit voltage Vovp, and the switching power supply may be in a critical overvoltage status. The overvoltage protection signal may thus go active to begin output overvoltage regulation. If voltage V1 across capacitor $C_1$ is less than voltage V2 across capacitor $C_2$ at the end of time interval T2, the relationship can be obtained as in formula (9) below.

$$Vin \times T1 = Vo \times (T1+T2) < Vovp \times (T1+T2) \quad (9)$$

Therefore, output voltage Vo may be less than upper limit voltage Vovp, and the switching power supply may not be in an overvoltage status. Thus, the overvoltage protection signal may be inactive, and no associated output overvoltage regulation may occur. For example, current I1 can be represented as below in formula (10).

$$I1 = Vin \times a \quad (10)$$

Also, voltage V1 across capacitor $C_1$ can be represented as below in formula (11).

$$V1 = \frac{I1}{C1} \times T1 = \frac{Vin \times a}{C1} \times T1 \quad (11)$$

Current I2 can be represented as below in formula (12).

$$I2 = Vovp \times b = \frac{Vovp \times a \times C2}{C1} \quad (12)$$

Thus, voltage V2 across capacitor $C_2$ can be represented as below in formula (13).

$$V2 = \frac{I2 \times (T1+T2)}{C2} = \frac{Vovp \times a}{C1} \times (T1+T2) \quad (13)$$

When voltage V1=V2, the relationship can be as per formula (14).

$$Vin \times T1 = Vo \times (T1+T2) = Vovp \times (T1+T2) \quad (14)$$

Also, output voltage Vo may be consistent with or the same level as upper limit voltage Vovp, and when voltage V1<V2, the relationship can be as per formula (15).

$$Vin \times T1 = Vo \times (T1+T2) < Vovp \times (T1+T2) \quad (15)$$

Output voltage Vo may be less than upper limit voltage Vovp, and when voltage V1>V2, the relationship can be as per formula (16).

$$Vin \times T1 = Vo \times (T1+T2) > Vovp \times (T1+T2) \quad (16)$$

Output voltage Vo may be higher than upper limit voltage Vovp. In this example, in each switching period, capacitor $C_1$ may be charged by current I1 during time interval T1, and capacitor $C_2$ may be charged by current I2 during both time intervals T1 and T2. Also, output overvoltage status can be determined in accordance with a voltage comparison signal generated by comparing voltage V1 against voltage V2 at the end of time interval T2. If voltage V1 is at least as high as voltage V2, the switching power supply may be in an overvoltage status, and the overvoltage protection signal may be active to start the implementation of output overvoltage protection control.

Figure 5:
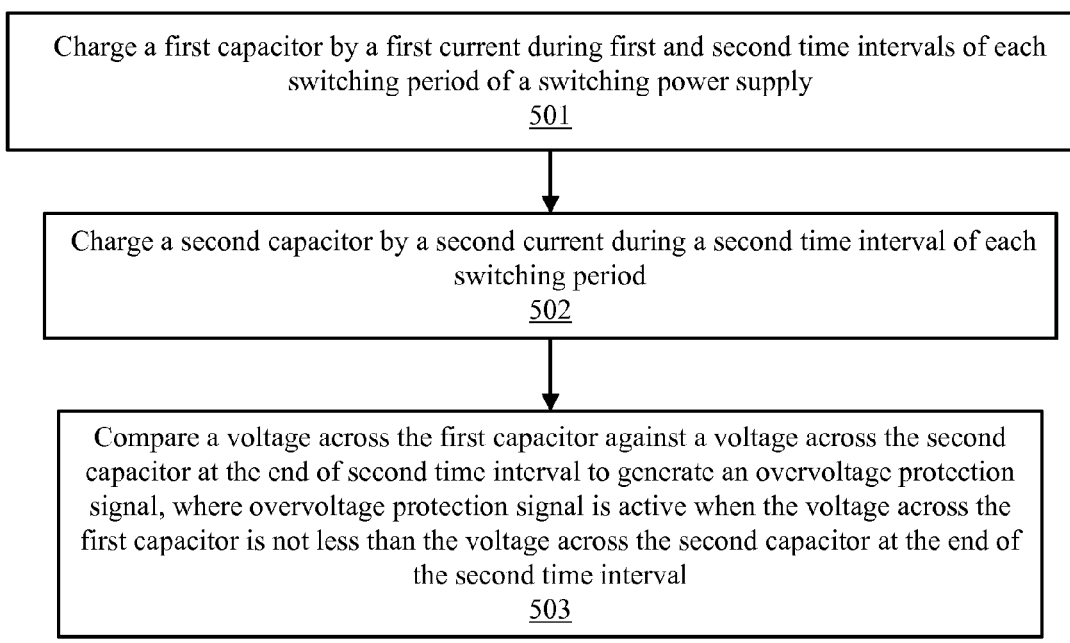
FIG. 5 is a flow diagram of a third example output overvoltage protection method, in accordance with embodiments of the present invention.

Referring now to FIG. 5, shown is a flow diagram of a third example output overvoltage protection method, in accordance with embodiments of the present invention. Viewing in conjunction with FIG. 15 for a boost switching power supply example, at capacitor $C_1$ may be charged by a current I1 during time intervals T1 and T2 of each switching period of the switching power supply. From the beginning of time interval T1 until the end of time interval T2, capacitor $C_1$ may be charged by current I1. During time interval T1, the inductor current increases from zero to a maximum value.

At 502, capacitor $C_2$ may be charged by a current I2 during time interval T2 of each switching period. From the beginning of time interval T2 until the end of time interval T2, capacitor $C_2$ may be charged by current I2. During time interval T2, the inductor current may decrease from the maximum value to zero. At 503, voltage V1 across capacitor $C_1$ may be compared against voltage V2 across capacitor $C_2$ at the end of time interval T2 to generate an overvoltage protection signal. When voltage V1 across capacitor $C_1$ is not less than voltage V2 across capacitor $C_2$ at the end of time interval T2, the overvoltage protection signal may be activated. In accordance with volt-second balance principle of the inductor of a boost switching power supply, the following formula (17) can be concluded.

$$Vin \times T1 = (Vo - Vin) \times T2 \qquad (17)$$

Formula (17) can be converted to be as formula (18) below.

$$Vin \times (T1 + T2) = Vo \times T2 \qquad (18)$$

From formula (18), the time coefficient of input voltage Vin may be the sum of time intervals T1 and T2. Also, the time coefficient of output voltage Vo may be time interval T2. Current I1 may be in direct proportion with input voltage Vin, the proportionality coefficient of which may be represented as "a". Current I2 may be in direct proportion with upper limit voltage Vovp, and the proportionality coefficient of which may be represented as "b". Voltage V1 across capacitor $C_1$ can be indicated as below in formula (19).

$$V1 = \frac{I1}{C1} \times (T1 + T2) = \frac{Vin \times a}{C1} \times (T1 + T2) \qquad (19)$$

Voltage V1 across capacitor C1 can be indicated as formula (20), as concluded from formulas (18) and (19).

$$V1 = \frac{Vin \times a}{C1} \times (T1 + T2) = Vo \times T2 \times \frac{a}{C1} \qquad (20)$$

Voltage V2 across capacitor $C_2$ can be indicated as below in formula (21).

$$V2 = \frac{I2}{C2} \times T2 = \frac{Vovp \times b}{C2} \times T2 \qquad (21)$$

If proportionality coefficients "a" and "b" meet the following relationship, as per formula (22).

$$\frac{C1}{C2} = \frac{a}{b} \qquad (22)$$

When voltage V1=V2, the relationship can be per formula (23) below.

$$Vo \times T2 = Vovp \times T2 \qquad (23)$$

Output voltage Vo may be consistent with upper limit voltage Vovp, and when voltage V1<V2, the relationship can be per formula (24) below.

$$Vo \times T2 < Vovp \times T2 \qquad (24)$$

Output voltage Vo may be less than upper limit voltage Vovp, and when voltage V1>V2, the relationship can be per formula (25) below.

$$Vo \times T2 > Vovp \times T2 \qquad (25)$$

Output voltage Vo may be higher than upper limit voltage Vovp. When voltage V1 is not less than voltage V2, output voltage Vo can be at least as high as upper limit voltage Vovp, and the overvoltage protection signal may be active to start appropriate output overvoltage protection control.

Figure 6:
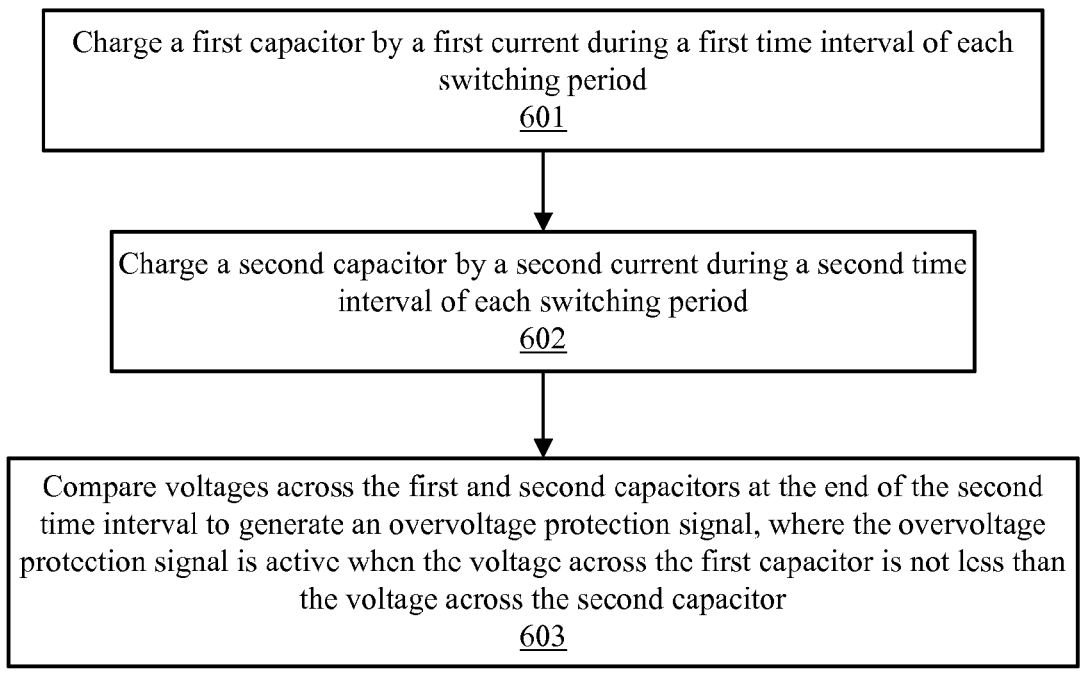
FIG. 6 is a flow diagram of a fourth example output overvoltage protection method, in accordance with embodiments of the present invention.

Referring now to FIG. 6, shown is a flow diagram of a fourth example output overvoltage protection method, in accordance with embodiments of the present invention. Viewing in conjunction with FIG. 15, an output overvoltage protection approach in this example may be applied in a buck-boost switching power supply. In accordance with the volt-second balance principle of the inductor of the buck-boost switching power supply, the following formula (26) can be concluded.

$$Vin \times T1 = Vo \times T2 \qquad (26)$$

From formula (26), the time coefficient of input voltage Vin may be time interval T1, and the time coefficient of the output voltage Vo may be time interval T2. For example, Vin represents the input voltage of the buck-boost switching power supply, Vo represents the output voltage of the buck-boost switching power supply, T1 represents a time interval during which the inductor current increases from zero to a maximum value, and T2 represents a time interval during which the inductor current decreases from the maximum value to zero.

At 601, capacitor $C_1$ may be charged by current I1 during time interval T1 of each switching period. Current I1 may be in direct proportion with input voltage Vin, the proportionality coefficient of which may be represented as "a". At 602, capacitor $C_2$ may be charged by current I2 during time interval T2 of each switching period. Current I2 may be in direct proportion with upper limit voltage Vovp withstand of the load of the buck-boost switching power supply, and the proportionality coefficient of which may be represented as "b". At 603, voltage V1 across capacitor $C_1$ may be compared against voltage V2 across capacitor $C_2$ at the end of time interval T2, in order to generate an overvoltage protection signal. When voltage V1 is not less than voltage V2, the overvoltage protection signal may be activated. Voltage V1 across capacitor $C_1$ can be represented as below per formula (27).

$$V1 = \frac{I1}{C1} \times T1 = \frac{Vin \times a}{C1} \times T1 \qquad (27)$$

Voltage V2 across capacitor $C_2$ can be represent as below in formula (28).

$$V2 = \frac{I2}{C2} \times T2 = \frac{Vovp \times b}{C2} \times T2 \qquad (28)$$

Proportionality coefficients "a" and "b" meet the following formula (29).

$$\frac{a}{b} = \frac{C1}{C2} \qquad (29)$$

From formulas (26)-(29), when voltage V1=V2, the relationship can be per formula (30) below.

$$Vin \times T1 = Vo \times T2 = Vovp \times T2 \qquad (30)$$

Therefore, output voltage Vo may be consistent with upper limit voltage Vovp, and when voltage V1<V2, the relationship can be per formula (31) below.

$$Vin \times T1 = Vo \times T2 < Vovp \times T2 \qquad (31)$$

Output voltage Vo may be less than upper limit voltage Vovp, and when voltage V1>V2, the relationship can be per formula (32) below.

$$Vin \times T1 = Vo \times T2 > Vovp \times T2 \tag{32}$$

Output voltage Vo may be higher than upper limit voltage Vovp. When voltage V1 is at least as high as voltage V2, output voltage Vo may be at least as high as upper limit voltage Vovp, and the overvoltage protection signal can be activated to start appropriate output overvoltage protection control.

Figure 7:
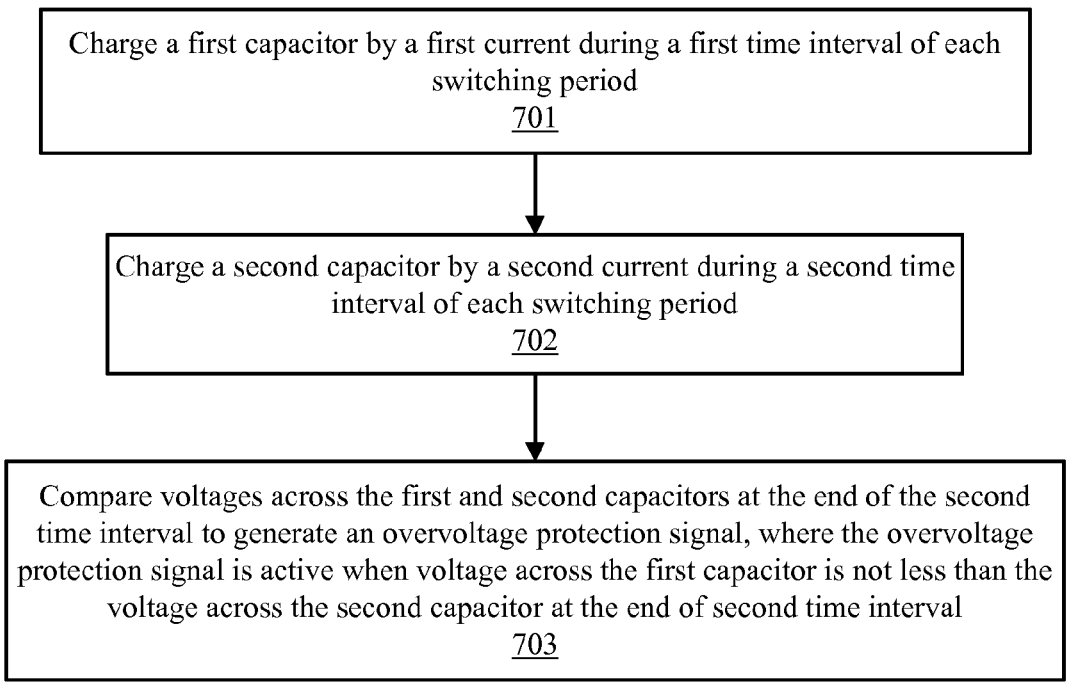
FIG. 7 is a flow diagram of a fifth example output overvoltage protection method, in accordance with embodiments of the present invention.

Referring now to FIG. 7, shown is a flow diagram of a fifth example output overvoltage protection method, in accordance with embodiments of the present invention. Viewing in conjunction with FIG. 15, this example output overvoltage protection approach can be applied in a flyback switching power supply. In accordance with the volt-second balance principle of the inductor of the primary winding of the flyback switching power supply, formula (33) can be concluded.

$$Vin \times T1 = n \times Vo \times T2 \tag{33}$$

For example, Vin represents the input voltage of the flyback switching power supply, Vo represents the output voltage of the flyback switching power supply, "n" represents the ratio of a primary winding and a secondary winding of a transformer of the flyback switching power supply, T1 represents a time interval during which the inductor current of the primary winding increases from zero to a maximum value, and T2 represents a time interval during which the inductor current of the primary winding decreases from the maximum value to zero. From formula (26), the time coefficient of input voltage Vin may be time interval T1, and the time coefficient of the output voltage Vo may be time interval T2.

At 701, capacitor $C_1$ may be charged by current I1 during time interval T1 of each switching period. Current I1 may be in direct proportion with input voltage Vin, the proportionality coefficient of which may be represented as "a". At 702, capacitor $C_2$ may be charged by current I2 during time interval T2 of each switching period. Current I2 may be in direct proportion with upper limit voltage Vovp withstand of the load of the flyback switching power supply, and the proportionality coefficient of which may be represented as "b". For example, proportionality coefficients "a" and "b" meet the following relationship as in formula (34).

$$\frac{b}{a} = n \times \frac{C2}{C1} \tag{34}$$

At 703, voltage V1 across capacitor $C_1$ may be compared against voltage V2 across capacitor $C_2$ at the end of time interval T2, in order to generate an overvoltage protection signal. When voltage V1 is not less than voltage V2 at the end of second time interval T2, the overvoltage protection signal may be activated. Voltage V1 can be calculated as below in formula (35).

$$V1 = \frac{I1}{C1} \times T1 = \frac{Vin \times a}{C1} \times T1 = Vo \times T2 \times n \times \frac{a}{C1} \tag{35}$$

Voltage V2 can be calculated as below in formula (36).

$$V2 = \frac{I2}{C2} \times T2 = Vovp \times T2 \times \frac{b}{C2} \tag{36}$$

When voltage V1=V2, the relationship can be per formula (37) below.

$$Vo \times T2 \times n \times \frac{a}{C1} = Vovp \times T2 \times \frac{b}{C2} \tag{37}$$

From formulas (37) and (34), output voltage Vo may be consistent with (e.g., the same level as) upper limit voltage Vovp. When voltage V1<V2, the relationship can be per formula (38) below.

$$Vo \times T2 \times n \times \frac{a}{C1} < Vovp \times T2 \times \frac{b}{C2} \tag{38}$$

Thus, output voltage Vo is less than upper limit voltage Vovp. When voltage V1>V2, the relationship can be per formula (39) below.

$$Vo \times T2 \times n \times \frac{a}{C1} > Vovp \times T2 \times \frac{b}{C2} \tag{39}$$

Thus, output voltage Vo may be higher than upper limit voltage Vovp. When voltage V1 is at least as high as voltage V2, output voltage Vo can be at least as high as upper limit voltage Vovp, and the overvoltage protection signal may be activated to start the output overvoltage protection control measures.

Figure 8:
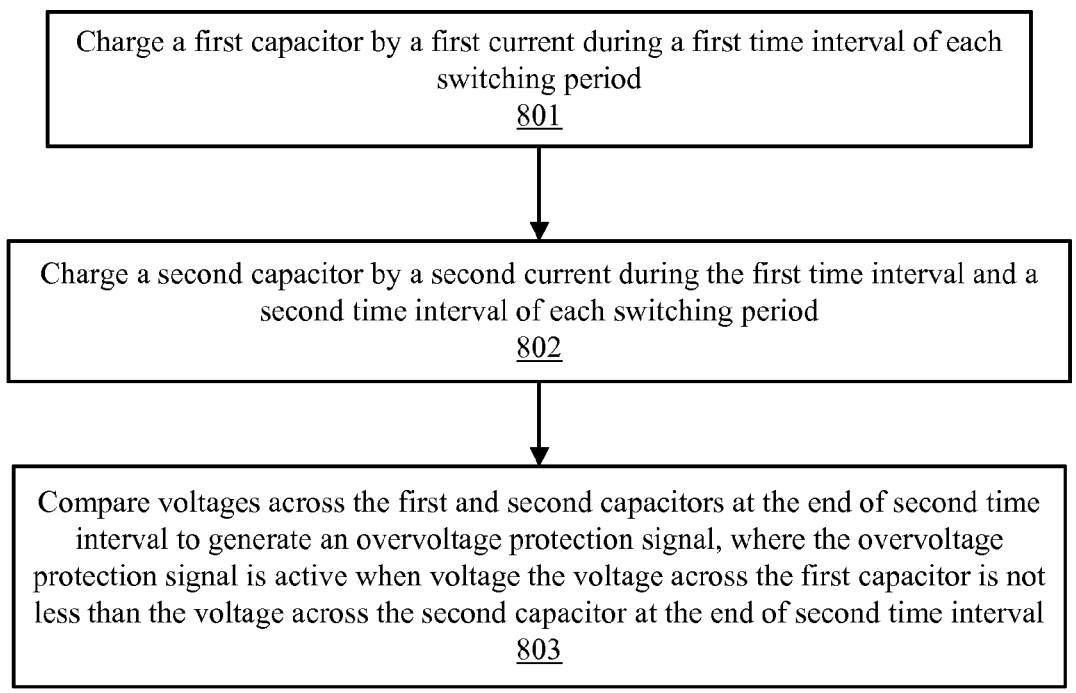
FIG. 8 is a flow diagram of a sixth example output overvoltage protection method, in accordance with embodiments of the present invention.
Figure 9:
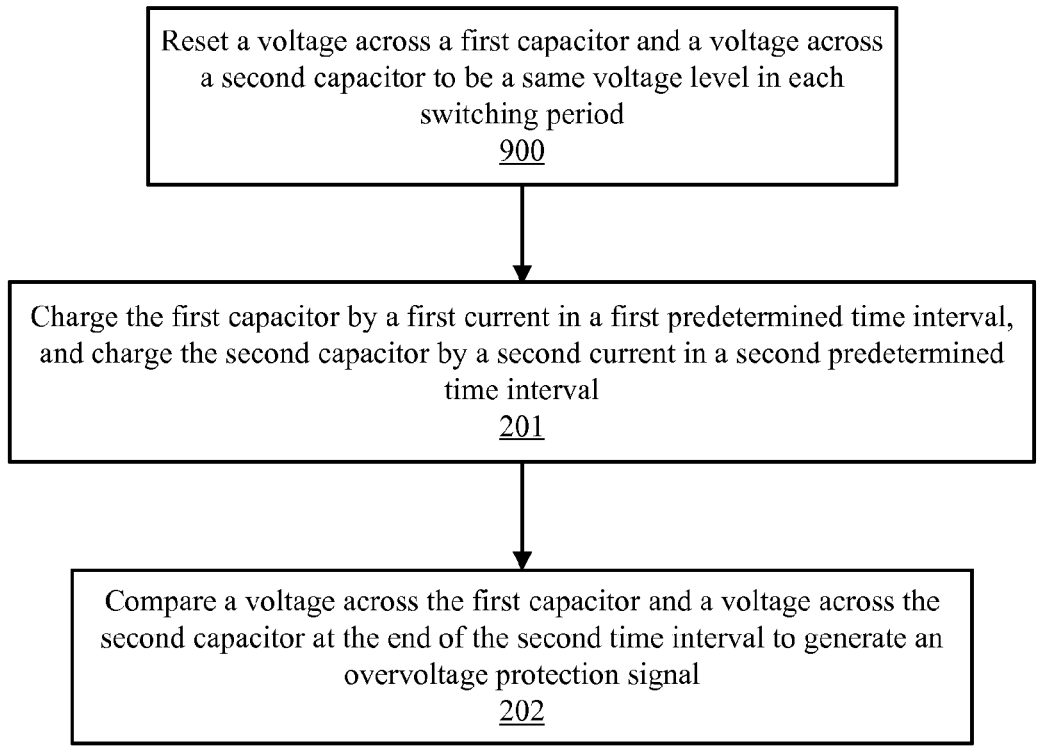
FIG. 9 is a flow diagram of an alternate first example output overvoltage protection method, in accordance with embodiments of the present invention.
Figure 10:
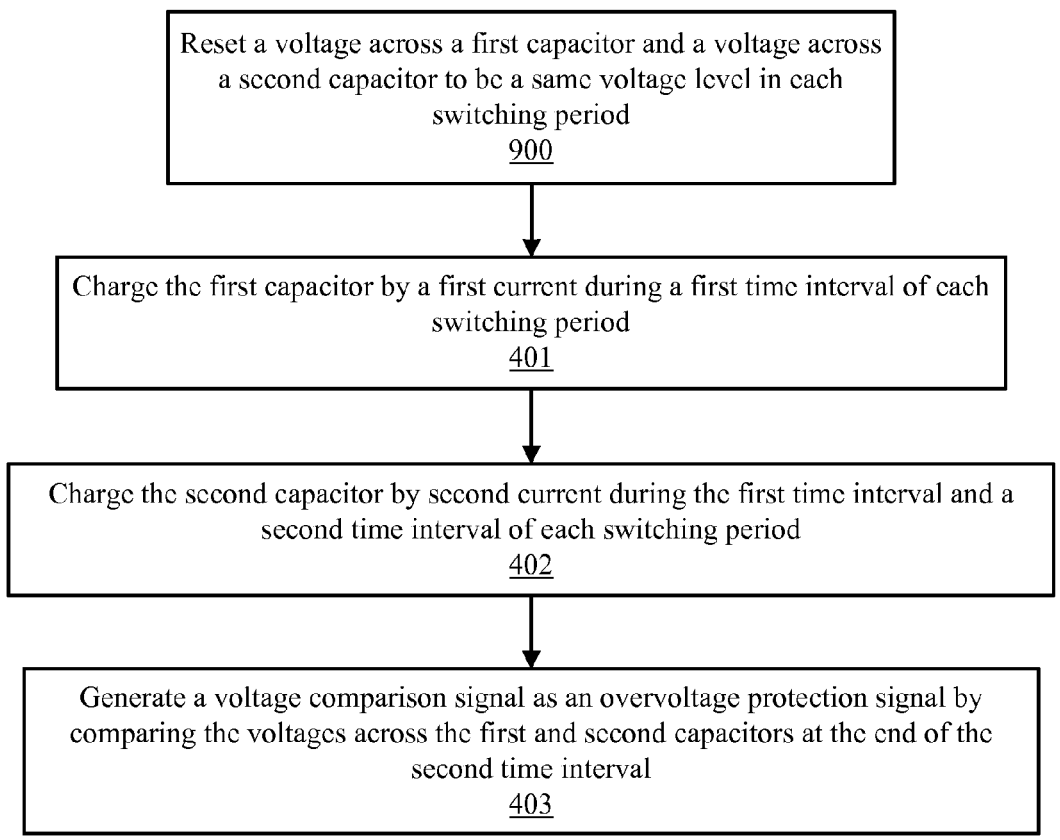
FIG. 10 is a flow diagram of an alternate second example output overvoltage protection method, in accordance with embodiments of the present invention.
Figure 11:
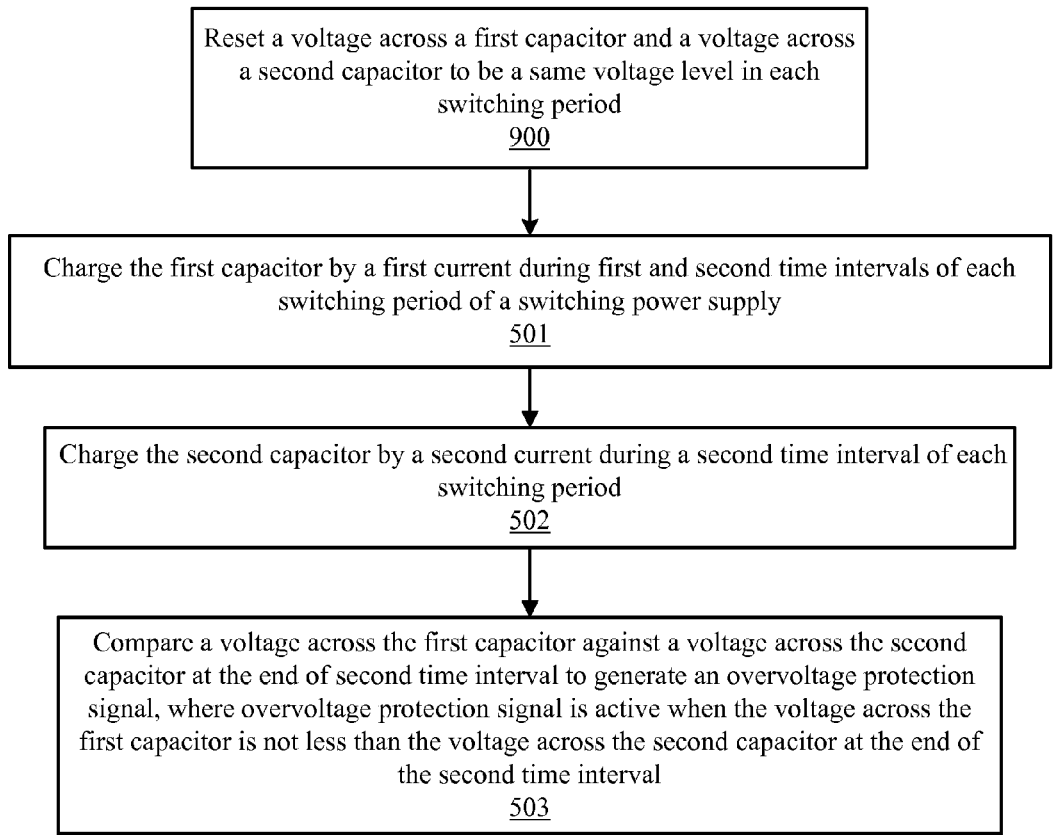
FIG. 11 is a flow diagram of an alternate third example output overvoltage protection method, in accordance with embodiments of the present invention.
Figure 12:
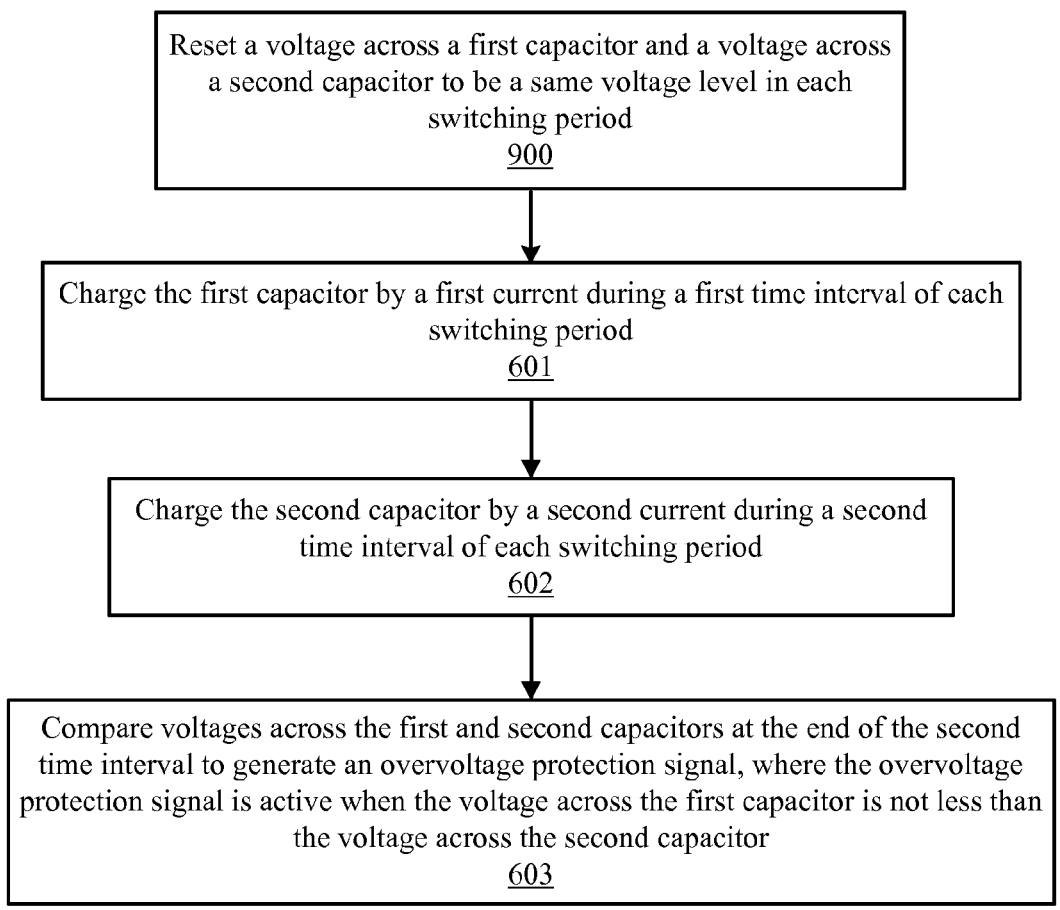
FIG. 12 is a flow diagram of an alternate fourth example output overvoltage protection method, in accordance with embodiments of the present invention.
Figure 13:
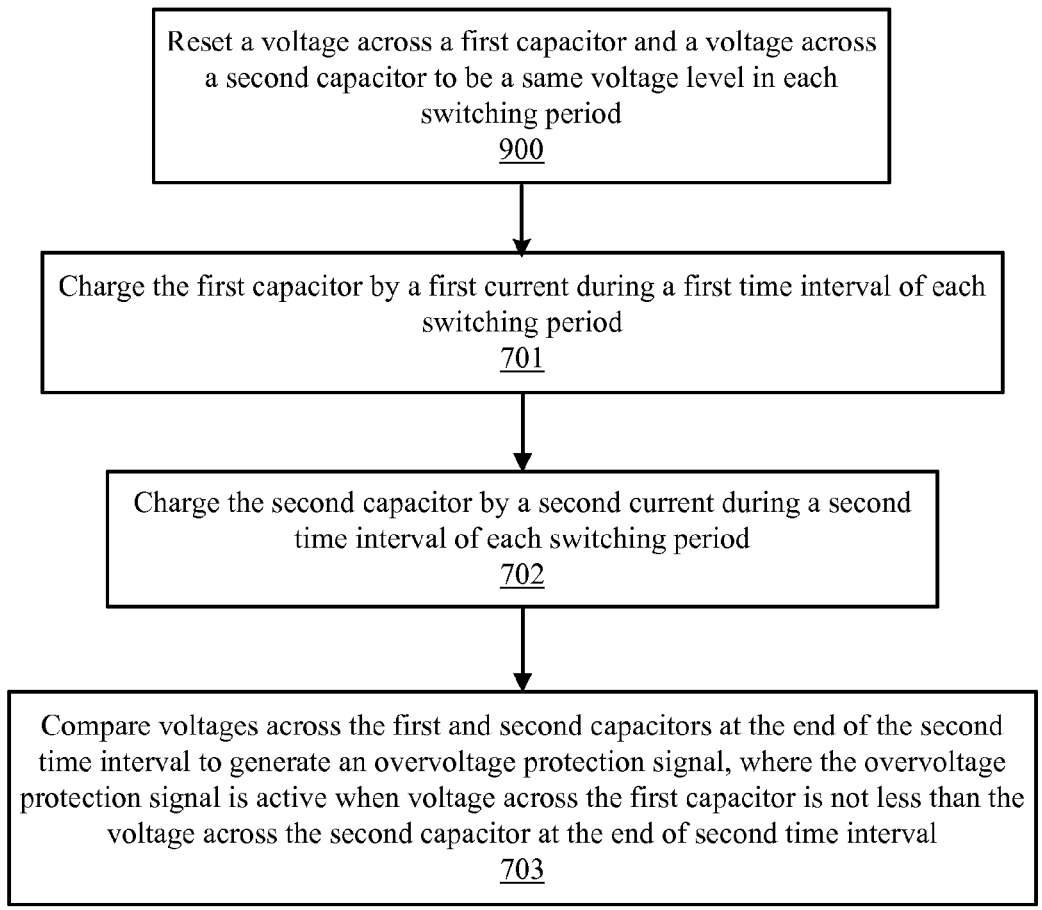
FIG. 13 is a flow diagram of an alternate fifth example output overvoltage protection method, in accordance with embodiments of the present invention.
Figure 14:
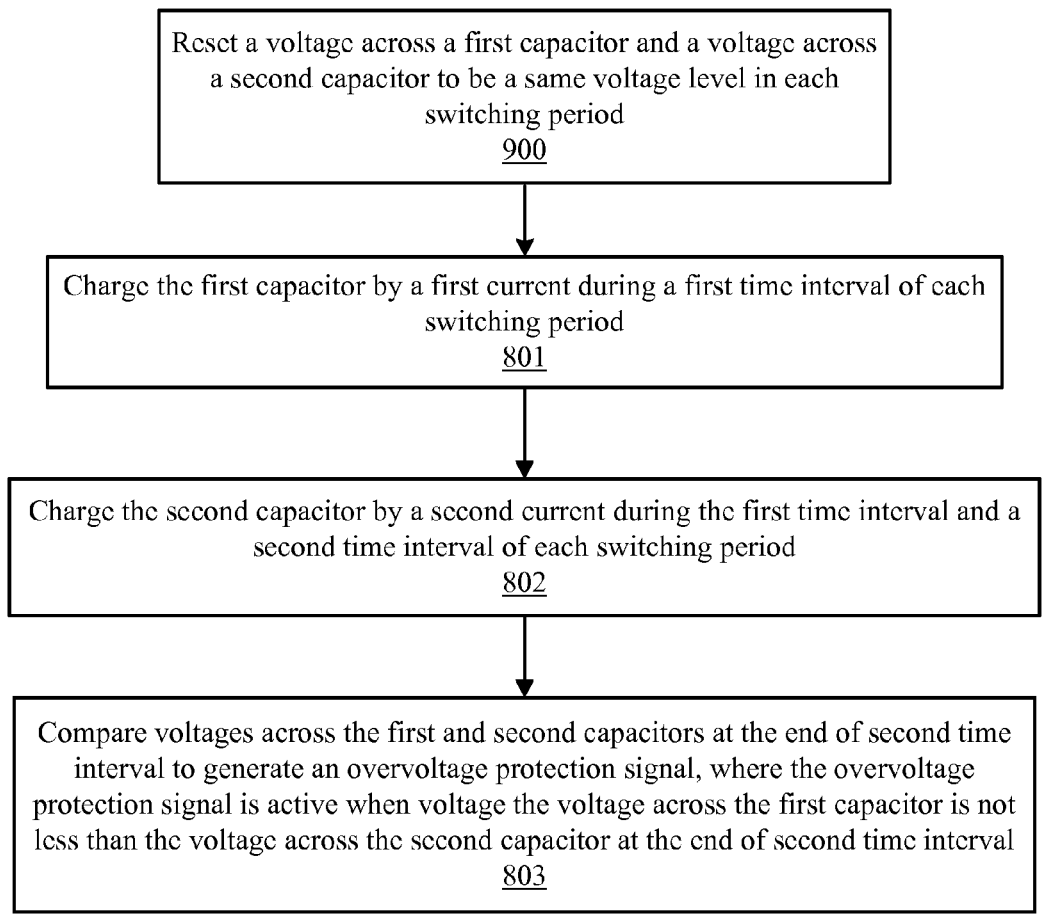
FIG. 14 is a flow diagram of an alternate sixth example output overvoltage protection method, in accordance with embodiments of the present invention.

Referring now to FIG. 8, shown is a flow diagram of a sixth example output overvoltage protection method, in accordance with embodiments of the present invention. Viewing in conjunction with FIG. 15, this example output overvoltage protection approach may be applied in a forward switching power supply. In accordance with the volt-second balance principle of the inductor of the forward switching power supply, formula (40) can be concluded as below.

$$Vin \times T1 = n \times Vo \times (T1 + T2) \tag{40}$$

At 801, capacitor $C_1$ may be charged by current I1 during time interval T1 of each switching period. Current I1 may be in direct proportion with input voltage Vin, the proportionality coefficient of which may be represented as "a". At 802, capacitor $C_2$ may be charged by current I2 during both of time intervals T1 and T2 of each switching period. Current I2 may be in direct proportion with upper limit voltage Vovp withstand of the load of the flyback switching power supply, and the proportionality coefficient of which may be represented as "b". At 803, voltage V1 across capacitor $C_1$ may be compared against voltage V2 across capacitor $C_2$ at the end of time interval T2, in order to activate an overvoltage protection signal. When voltage V1 is at least as high as voltage V2 at the end of time interval T2, the overvoltage protection signal may be active.

From formula (40), the time coefficient of input voltage Vin may be time interval T1, and the time coefficient of the output voltage Vo may be the sum of time intervals T1 and T2, and "n" can represent a proportionality coefficient. For example, proportionality coefficients "a" and "b" can meet the following relationship as below in formula (41).

$$\frac{b}{a} = n \times \frac{C2}{C1} \quad (41)$$

Voltage V1 can be calculated as per formula (42) below.

$$V1 = \frac{I1}{C1} \times T1 = \frac{Vin \times a}{C1} \times T1 = Vo \times (T1+T2) \times n \times \frac{a}{C1} \quad (42)$$

Voltage V2 can be calculated as per formula (43) below.

$$V2 = \frac{I2}{C2} \times T2 = Vovp \times (T1+T2) \times \frac{b}{C2} \quad (43)$$

When voltage V1=V2, the relationship can be per formula (44) below.

$$Vo \times (T1+T2) \times n \times \frac{a}{C1} = Vovp \times (T1+T2) \times \frac{b}{C2} \quad (44)$$

Thus, output voltage Vo may be consistent with upper limit voltage Vovp. When voltage V1<V2, the relationship can be per formula (45) below.

$$Vo \times (T1+T2) \times n \times \frac{a}{C1} < Vovp \times (T1+T2) \times \frac{b}{C2} \quad (45)$$

Thus, output voltage Vo may be less than upper limit voltage Vovp. When voltage V1>V2, the relationship can be per formula (46) below.

$$Vo \times (T1+T2) \times n \times \frac{a}{C1} > Vovp \times (T1+T2) \times \frac{b}{C2} \quad (46)$$

Thus, output voltage Vo may be higher than upper limit voltage Vovp. When voltage V1 is at least as high as voltage V2, output voltage Vo can be at least as high as upper limit voltage Vovp, and the overvoltage protection signal may be activated to start the output overvoltage protection control measures.

Referring now to FIGS. 9-14, shown are flow diagrams of alternate corresponding example output overvoltage protection methods, in accordance with embodiments of the present invention. Based on the above examples, prior to 201, 401, 501, 601, 701, and 801 when capacitor $C_1$ is charged by current I1, 900 can be included. At 900, voltage V1 across capacitor $C_1$ and voltage V2 across capacitor $C_2$ can be reset to be an identical voltage (e.g., a same voltage level) in each switching period. In this way, voltages V1 and V2 can be consistent with each other before capacitors $C_1$ and $C_2$ begin to be charged. Because voltage V1 across capacitor $C_1$ and voltage V2 across capacitor $C_2$ are reset to be substantially the same voltage before capacitors $C_1$ and $C_2$ are charged, error accumulation can be substantially avoided, in order to improve control accuracy of the output overvoltage protection control.

In each switching period, the time interval from the end of time interval T2 to the beginning of a next switching period may be indicated as time interval T3. Voltage V1 of capacitor $C_1$ and voltage V2 of capacitor $C_2$ can be reset to be an original voltage (e.g., zero) prior to time interval T3, or during time interval T3 (e.g., during the entire time interval T3). Time interval T3 can be a resonant time interval of the inductor current of each switching period. In this example, positive terminals of both of capacitors $C_1$ and $C_2$ can be coupled to ground via reset circuits to reset voltages V1 and V2 to zero. Voltages V1 and V2 can be maintained at substantially zero at the beginning of each switching period, in order to simplify circuit design and decrease cost. Of course, other voltage values (e.g., to a predetermined reference level) can be utilized as this reset voltage in other cases.

Referring now to FIG. 15, shown is a schematic block diagram of an example output overvoltage protection circuit, in accordance with embodiments of the present invention. This particular example can include charging circuit 1502, charging circuit 1503, and comparison circuit 1501. Comparison circuit 1501 can connect to charging circuits 1502 and 1503. Charging circuit 1502 can include current generation circuit Is1, switch (e.g., transistor) K1, and capacitor $C_1$ connected in series between voltage source Vdd and ground. When switch K1 is turned on, capacitor $C_1$ may be charged by current I1 from current generation circuit Is1. For example, current I1 may be in direct proportion with input voltage Vin, and the proportionality coefficient of which may be represented as "a".

Charging circuit 1503 can include current source Is2, switch K2, and capacitor $C_2$ connected in series and in sequence between voltage source Vdd and ground. When switch K2 is turned on, capacitor $C_2$ may be charged by current I2 from current source Is2. For example, current I2 may be in direct proportion with upper limit voltage Vovp, and the proportionality coefficient of which may be represented as "b". The operation of switch K1 may be controlled by control signal G1, and the operation of K2 may be controlled by signal G2.

In accordance with various suitable topologies of the switching power supply, the charging time (e.g., the on time of switches K1 and K2) can be determined by corresponding control signals G1 and G2. Comparison circuit 1501 can include comparator COMP1, D flip-flop 1504, and inverter 1505. Comparator COMP1 may compare voltage V1 across capacitor $C_1$ at the inverting input terminal against voltage V2 across capacitor $C_2$ at the non-inverting input terminal, to generate a comparison signal. Input terminal D of D flip-flop 1504 can connect to an output of comparator COMP1, clock control terminal CP can connect to the output of inverter 1505, and inverter 1505 may receive a pulse signal. The clock signal at CP may be active at the end of time interval T2 of each switching period to trigger D flip-flop 1504. Therefore, output Q of D flip-flop 1504 may effectively provide the output from comparator COMP1 at the end of time interval T2 of each switching period, and may be configured as overvoltage protection signal OVP.

For example, pulse signal Tdis may be a falling edge at the end of time interval T2 of each switching period, which may be then converted to a rising edge through inverter 1505 as the clock signal to trigger D flip-flop 1504. Time interval T1 may be a duration of a continuous rising time of the inductor current from zero to a maximum value, and time interval T2 may be a duration of a continuous falling time of the inductor current from the maximum value to zero. Pulse signal Tdis can represent the duration of the inductor current including the rising and falling times of the inductor current, which may be the sum of time intervals T1 and T2.

The output overvoltage protection circuit can further include reset circuit 1506, which can connect to capacitors $C_1$ and $C_2$. Reset circuit 1506 can reset voltages V1 and V2 to a same voltage (e.g., zero) to substantially avoid error accumulation, and to improve control accuracy of the overvoltage protection circuit. In this example, reset circuit 1506 can include switch K3 connected to capacitor $C_1$, and switch K4 connected to capacitor $C_2$. For example, switch K3 can connect between a positive terminal of capacitor $C_1$ and ground, and switch K4 can connect between a positive terminal of capacitor $C_2$ and ground. After the end of time interval T2 of each switching period, and before the beginning of next switching period, switches K3 and K4 can be turned on to rapidly discharge capacitors $C_1$ and $C_2$ to zero. The operation of switches K3 and K4 may be controlled by a reset signal that is active during the time from the end of time interval T2 to the beginning of a next switching period.

The operation of switches K1 and K2 can be controlled in accordance with a given topology of the switching power supply by corresponding control signals G1 and G2. In accordance with the volt-second balance principle of the inductor of the switching power supply, in each switching period, the charging time of capacitor C1 (e.g., the on time of switch K1) may be consistent with (e.g., substantially the same as) the time coefficient of input voltage Vin. Also, the charging time of capacitor $C_2$ (e.g., the on time of switch K2) may be consistent with the time coefficient of output voltage Vo.

For example, when the switching power supply is configured as a buck topology, as discussed above, the time coefficient of input voltage Vin may be time interval T1. Thus, in each switching period, the charging time of capacitor $C_1$ may be consistent with (or the same as) time interval T1. Further, the time coefficient of output voltage Vo may be the sum of time intervals T1 and T2. Therefore, the charging time of capacitor $C_2$ may be the same as the sum of time intervals T1 and T2.

When the switching power supply is configured in a boost topology, as discussed above, the time coefficient of input voltage Vin may be the sum of time intervals T1 and T2. Thus, in each switching period, the charging time of capacitor $C_1$ may be consistent with (e.g., substantially the same as) the sum of time intervals T1 and T2. Also, the time coefficient of output voltage Vo may be time interval T2. Therefore, the charging time of capacitor $C_2$ may be substantially the same as time interval T2.

When the switching power supply is configured as a buck-boost topology, as discussed above, the time coefficient of input voltage Vin may be time interval T1. Thus, in each switching period, the charging time of capacitor $C_1$ may be consistent with (e.g., substantially the same as) time interval T1. Also, the time coefficient of output voltage Vo may be time interval T2. Therefore, the charging time of capacitor $C_2$ may be the same as time interval T2.

When the switching power supply is configured as a flyback topology, as discussed above, the time coefficient of input voltage Vin may be time interval T1. Thus, in each switching period, the charging time of capacitor $C_1$ may be consistent with (e.g., substantially the same as) time interval T1. Also, the time coefficient of output voltage Vo may be second time interval T2. Therefore, the charging time of capacitor $C_2$ may be the same as time interval T2.

When the switching power supply is configured as a forward topology, as discussed above, the time coefficient of input voltage Vin may be time interval T1. Thus, in each switching period, the charging time of capacitor $C_1$ may be consistent with (e.g., substantially the same as) time interval T1. Also, the time coefficient of output voltage Vo may be the sum of time intervals T1 and T2. Therefore, the charging time of second capacitor $C_2$ may be substantially the same as the sum of time intervals T1 and T2.

Comparison circuit 1501 can be implemented in various other ways in certain embodiments. For example, another comparator with an enable control can be included in comparison circuit 1501. The inverting input terminal may receive voltage V1 across capacitor $C_1$, and the non-inverting input terminal may receive voltage V2 across capacitor $C_2$. At the end of time interval T2, an enable signal may be activated. The output of this additional comparator may generate a signal that represents the comparison result of voltages V1 and V2, which may be configured as the overvoltage protection signal.

Figure 16:
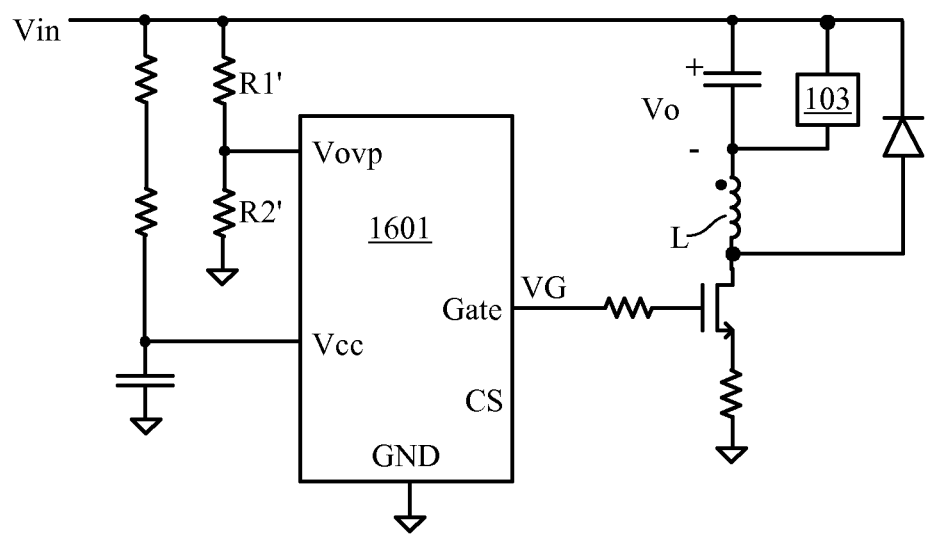
FIG. 16 is a schematic block diagram of an example switching power supply with an output overvoltage protection circuit, in accordance with embodiments of the present invention.
Figure 17:
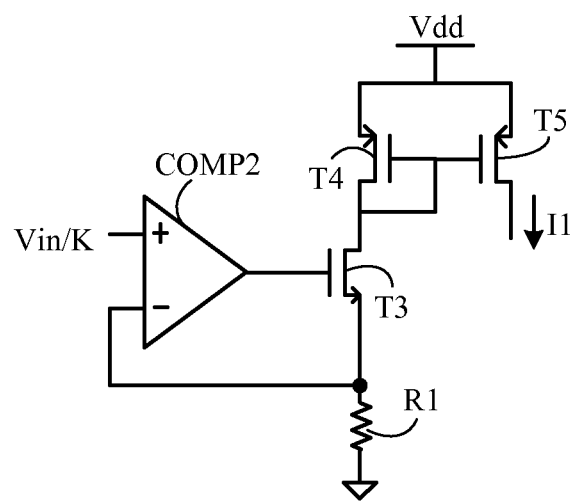
FIG. 17 is a schematic block diagram of an example current generation circuit, in accordance with embodiments of the present invention.

Referring now to FIG. 16, shown is a schematic block diagram of an example switching power supply with an output overvoltage protection circuit, in accordance with embodiments of the present invention. Also referring to FIG. 17, shown is a schematic block diagram of an example current generation circuit, in accordance with embodiments of the present invention. Current generation circuit Is1 may generate current I1 in direct proportion to input voltage Vin. Current generation circuit Is1 can include operational amplifier COMP2, a current generation circuit including resistor R1 and transistor T3, and a current mirror including transistors T4 and T5.

Input voltage Vin can connect to the non-inverting input terminal of operational amplifier COMP2. For example, a resistor divider, including resistors R1' and R2' coupled in series between input voltage Vin and ground, can be employed to generate a division voltage that represents input voltage Vin at a common node of resistors R1' and R2'. The division coefficient can be represented as K. One terminal of resistor R1 can connect to both the inverting input terminal of operational amplifier COMP2 and the source of transistor T3, and the other terminal of resistor R1 can connect to ground.

The drain of transistor T3 can connect to the current mirror. Also, the gate of transistor T3 can connect to the output terminal of operational amplifier COMP2. The gates of transistors T4 and T5 can connect together to the common node between the drains of transistors T3 and T4. The sources of transistors T4 and T5 can connect together to voltage supply Vdd. The current of the drain of transistor T5 may be configured as current I1. If the coefficient of the current mirror is 1, current I1 can be indicated as below in formula (47).

$$I1 = \frac{Vin}{K \times R1} \tag{47}$$

Therefore, proportionality coefficient "a" can be indicated as below in formula (48).

$$a = \frac{1}{K \times R1} = \frac{R2'}{(R1' + R2') \times R1} \tag{48}$$

In accordance with the relationship of proportionality coefficients "a" and "b" of different topologies of switching power supplies, proportionality coefficient "b" can be then determined accordingly. In FIG. 16, a switching power supply including an integrated control circuit and a power stage (e.g., a buck topology) is shown. The output overvoltage protection circuit in particular embodiments can be integrated in integrated control circuit 1601. Control circuit 1601 can include an overvoltage protection pin, and a common node of resistors R1' and R2' can connect to the overvoltage protection pin.

In this way, output overvoltage detection can be accomplished by detection of the input voltage, but not the output voltage. Also, no auxiliary winding is needed, thus decreasing cost, simplifying circuit design, and improving control accuracy, as compared to other approaches. Further, when an output overvoltage is detected by the overvoltage protection circuit, a voltage suppression circuit can be enabled to decrease the output voltage as a protection measure. The voltage suppression circuit can include any suitable circuits. For example, when an output overvoltage state is detected, the voltage suppression circuit can turn off the main power switch of the switching power supply through the control circuit to decrease the output voltage to a safe range.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. An output overvoltage protection method for a switching power supply, the method comprising:
    a) charging a first capacitor by a first current during a first time interval of a switching period of said switching power supply, wherein said first current is in direct proportion with a first proportionality coefficient to an input voltage of said switching power supply, and wherein said first time interval is substantially the same as a time coefficient of said input voltage;
    b) charging a second capacitor by a second current during a second time interval of said switching period of said switching power supply, wherein said second current is in direct proportion with a second proportionality coefficient to an upper limit voltage of a load of said switching power supply, and wherein said second time interval is substantially the same as a time coefficient of an output voltage of said switching power supply; and
    c) generating an overvoltage protection signal by comparing a first voltage across said first capacitor against a second voltage across said second capacitor at the end of said second time interval, wherein said overvoltage protection signal is active when said first voltage is at least as high as said second voltage.

2. The method of claim 1, wherein:
    a) said first time interval comprises a time duration when an inductor current of an inductor in said switching power supply increases from zero to a maximum value; and
    b) said second time interval comprises a time duration when said inductor current decreases from said maximum value to zero.

3. The method of claim 1, further comprising charging said second capacitor by said second current during said first time interval.

4. The method of claim 1, further comprising charging said first capacitor by said first current in said second time interval.

5. The method of claim 1, wherein a ratio between said first and second proportionality coefficients is in direct proportion to a ratio between capacitances of said first and second capacitors.

6. The method of claim 1, further comprising resetting said first and second capacitors such that said first and second voltages are at a same voltage prior to a next switching period.

7. The method of claim 6, wherein said same voltage is zero.

8. The method of claim 6, wherein said switching power supply is configured as a boost topology.

9. An output overvoltage protection circuit configured in a switching power supply having a switching period comprising first and second time intervals, the output overvoltage protection circuit comprising:
    a) a first charging circuit configured to generate a first voltage that is in direct proportion with a first proportionality coefficient to a ratio of a product of an input voltage of said switching power supply and said first time interval, and a capacitance of a first capacitor, wherein said first time interval is substantially the same as a time coefficient of said input voltage;
    b) a second charging circuit configured to generate a second voltage that is in direct proportion with a second proportionality coefficient to ratio between a product of an upper limit voltage of a load of said switching power supply and said second time interval, and a capacitance of a second capacitor, wherein said second time interval is substantially the same as a time coefficient of an output voltage of said switching power supply; and
    c) a comparison circuit configured to compare said first voltage against said second voltage at the end of said second time interval to generate an overvoltage protection signal, wherein said overvoltage protection signal is active when said first voltage is at least as high as said second voltage.

10. The output overvoltage protection circuit of claim 9, wherein said first charging circuit comprises:
    a) a first current generation circuit configured to generate a first current in direct proportion with said input voltage;
    b) a first switch configured to be on during said first time interval; and
    c) said first capacitor configured to be charged by said first current when said first switch is on to generate said first voltage.

11. The output overvoltage protection circuit of claim 10, wherein said first current generation circuit comprises:
    a) an operational amplifier configured to receive said input voltage and an output from a current generation circuit; and
    b) a current mirror coupled to said current generation circuit, and configured to generate said first current in accordance with a current signal that is in direct proportion to.

12. The output overvoltage protection circuit of claim 9, wherein said second charging circuit comprises:
    a) a second current source configured to generate a second current in direct proportion with said upper limit voltage;
    b) a second switch configured to be on during said second time interval; and
    c) a second capacitor configured to be charged by said second current when said second switch is on to generate said second voltage.

13. The output overvoltage protection circuit of claim 9, wherein said comparison circuit comprises:
   a) a first comparator configured to compare said first and second voltages;
   b) a flip-flop having a first input terminal coupled to an output of said first comparator, a clock terminal coupled to a pulse signal via an inverter, and an output terminal configured to generate said overvoltage protection signal; and
   c) said pulse signal being configured to have a same switching period as said switching power supply, and to be active when an inductor current is not zero.

14. The output overvoltage protection circuit of claim 9, further comprising a reset circuit configured to reset said first and second capacitors such that said first and second voltages are at a same voltage prior to a next switching period.

15. The output overvoltage protection circuit of claim 14, wherein said same voltage is zero.

16. The output overvoltage protection circuit of claim 14, wherein said reset circuit comprises:
   a) a third switch coupled to said first charging circuit; and
   b) a fourth switch coupled to said second charging circuit, wherein said third and fourth switches are configured to be on during a time interval between the end of said second time interval and a beginning of said next switching period.

17. The output overvoltage protection circuit of claim 9, wherein:
   a) said first time interval comprises a time duration when an inductor current of an inductor in said switching power supply increases from zero to a maximum value; and
   b) said second time interval comprises a time duration when said inductor current decreases from said maximum value to zero.

18. The output overvoltage protection circuit of claim 9, wherein said second capacitor is configured to be charged by said second current during said first time interval.

19. The output overvoltage protection circuit of claim 9, wherein said first capacitor is configured to be charged by said first current during said second time interval.

20. The output overvoltage protection circuit of claim 9, wherein said switching power supply is configured as a boost topology.

* * * * *